United States Patent
Owada et al.

(10) Patent No.: US 11,126,915 B2
(45) Date of Patent: Sep. 21, 2021

(54) INFORMATION PROCESSING APPARATUS AND INFORMATION PROCESSING METHOD FOR VOLUME DATA VISUALIZATION

(71) Applicant: SONY CORPORATION, Tokyo (JP)

(72) Inventors: Shigeru Owada, Chiba (JP); Frank Nielsen, Saitama (JP)

(73) Assignee: SONY CORPORATION, Tokyo (JP)

( * ) Notice: Subject to any disclaimer, the term of this patent is extended or adjusted under 35 U.S.C. 154(b) by 153 days.

(21) Appl. No.: 16/516,208

(22) Filed: Jul. 18, 2019

(65) Prior Publication Data
US 2020/0118003 A1 Apr. 16, 2020

Related U.S. Application Data

(60) Provisional application No. 62/745,605, filed on Oct. 15, 2018.

(51) Int. Cl.
*G06K 9/62* (2006.01)
*G06N 3/08* (2006.01)
(Continued)

(52) U.S. Cl.
CPC .............. *G06N 3/088* (2013.01); *G06N 20/00* (2019.01); *G06T 15/005* (2013.01); *G06T 15/08* (2013.01)

(58) Field of Classification Search
CPC . G06T 2207/20081; G06T 2207/20084; G06T 2200/04; G06T 19/20; G06T 3/4046; G06T 17/00; G06T 2207/20092; G06T 7/90; G06K 9/00671; G06K 9/66; G06K 9/40
See application file for complete search history.

(56) References Cited

U.S. PATENT DOCUMENTS 10,373,055 B1 *  8/2019  Matthey-de-l'Endroit ................. G06N 3/0454
10,657,676 B1 *  5/2020  Rehfeld ............... G06N 3/0454
(Continued)

OTHER PUBLICATIONS

Gatys et al., Image Style Transfer Using Convolutional Neural Networks, 2016, 2016 IEEE Conference on Computer Vision and Pattern Recognition, pp. 2414-2423.*

(Continued)

*Primary Examiner* — Guillermo M Rivera-Martinez
(74) *Attorney, Agent, or Firm* — Chip Law Group (57) ABSTRACT

An information processing apparatus and a method for volume data visualization is provided. The information processing apparatus stores an auto-encoder that includes an encoder network and a decoder network. The encoder network includes a loss function and a first plurality of neural network (NN) layers. The information processing apparatus inputs volume data to an initial NN layer of the first plurality of NN layers and generates a latent image as an output from a final NN layer of the first plurality of NN layers based on application of the encoder network on the input volume data. The information processing apparatus estimates a distance between the generated latent image and a reference image based on the loss function and updates the encoder network based on the estimated distance. Finally, the information processing apparatus outputs the updated encoder network as a trained encoder network based on the estimated distance being a minimum.

19 Claims, 8 Drawing Sheets

(51) Int. Cl.
*G06T 15/00* (2011.01)
*G06T 15/08* (2011.01)
*G06N 20/00* (2019.01)

(56) References Cited

U.S. PATENT DOCUMENTS

| | | | |
|---|---|---|---|
| 2015/0112182 A1* | 4/2015 | Sharma | A61B 5/7264 |
| | | | 600/408 |
| 2016/0174902 A1* | 6/2016 | Georgescu | G06T 7/0012 |
| | | | 600/408 |
| 2016/0232440 A1* | 8/2016 | Gregor | G06N 3/0445 |
| 2018/0068463 A1* | 3/2018 | Risser | G06T 7/45 |
| 2018/0089888 A1* | 3/2018 | Ondruska | G06T 15/08 |
| 2018/0293496 A1* | 10/2018 | Vogels | G06K 9/6298 |
| 2018/0364717 A1* | 12/2018 | Douillard | G06K 9/00791 |
| 2019/0122075 A1* | 4/2019 | Zhang | G16H 50/20 |
| 2019/0213705 A1* | 7/2019 | Kamath | G06N 3/0454 |
| 2019/0244329 A1* | 8/2019 | Li | G06N 3/084 |
| 2019/0279075 A1* | 9/2019 | Liu | G06N 3/084 |
| 2019/0392304 A1* | 12/2019 | Aliper | G06N 3/088 |
| 2020/0012940 A1* | 1/2020 | Liu | H04N 7/0135 |
| 2020/0034654 A1* | 1/2020 | Mansi | G06N 20/20 |
| 2020/0104640 A1* | 4/2020 | Poole | G06N 3/0454 |
| 2020/0107023 A1* | 4/2020 | Lee | H04N 19/149 |
| 2020/0110158 A1* | 4/2020 | Ecins | G01S 7/497 |
| 2020/0234468 A1* | 7/2020 | Lerchner | G06T 9/002 |
| 2020/0351509 A1* | 11/2020 | Lee | G06N 3/0454 |
| 2020/0372344 A1* | 11/2020 | Mavroeidis | G06N 3/082 |
| 2020/0401916 A1* | 12/2020 | Rolfe | G06N 5/04 |

OTHER PUBLICATIONS

Johnson et al., Perceptual Losses for Real-Time Style Transfer and Super-Resolution, 2016, arXiv:1603.08155v1 [cs.CV] Mar. 27, 2016, pp. 1-18.*

Chen et al., StyleBank: An Explicit Representation for Neural Image Style Transfer, 2017, 2017 IEEE Conference on Computer Vision and Pattern Recognition (CVPR), pp. 1897-1906.*

Gatys, et al., "A Neural Algorithm of Artistic Style", arXiv:1508.06576v2, Cornell University, Sep. 2, 2015, 16 pages.

Gatys, et al., "A Neural Algorithm of Artistic style", Computer Vision and Pattern Recognition, ArXiv:1508.06576v2, Sep. 2, 2015, 16 pages.

* cited by examiner

INFORMATION PROCESSING APPARATUS AND INFORMATION PROCESSING METHOD FOR VOLUME DATA VISUALIZATION

CROSS-REFERENCE TO RELATED APPLICATIONS/INCORPORATION BY REFERENCE

This application claims priority to U.S. Provisional Patent Application Ser. No. 62/745,605 filed on Oct. 15, 2018, the entire content of which is hereby incorporated herein by reference.

FIELD

Various embodiments of the disclosure relate to volume visualization. More specifically, the present disclosure relates to a volume data visualization technique that automatically maps view dependent volumetric information to an RGB image using a variant of auto-encoder.

BACKGROUND

Visualization of volume data is a long-standing problem in scientific simulation, medical imaging, and computer graphics. The main difficulty lies in inherently ill-posed problem setting: "3D volumetric structure should be visually perceivable through the 2D images on projection planes". Much information is lost in dimension reduction process for the 3D volumetric structure. This problem has been tackled by plenty of approaches. One approach tries to automatically or manually pre-segment interesting/non-interesting regions and then visually enhance them, while others approaches rely on interactive techniques to convey better and richer information to the user. A common tool that is utilized to change the appearance of the data during visualization is Transfer Function (TF). TF defines a mapping from volumetric property (such as density) to color or opacity values. Since TFs are usually represented as a single or a combination of functions that take scalar arguments, they can easily be drawn and manipulated as a 2D toolset. However, proper TF settings to highlight interesting region is notoriously difficult, since its relation to the visual appearance is usually not trivial under complicated occlusions and non-uniform property distributions.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An information processing apparatus and method for volume data visualization is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed information processing apparatus and method for volume data visualization based on a variant of an auto-encoder. Exemplary aspects of the disclosure provide a volume visualization approach that automatically maps view dependent volume information to an RGB image (i.e. a latent image) based on the auto-encoder. The RGB image may be obtained from an encoder network of the auto-encoder as a latent representation of the original volume data. The latent image includes as much volume information as possible in the sense that a decoder network of the auto-encoder can approximately reconstruct the original volume data. While the volume structure is clearly visible in the latent image, the user can optionally provide reference images to control the entire color scheme of the latent image. Also, the disclosure minimizes the reconstruction error as in a standard auto-encoder, as well as the distance between latent image and reference images. This modality change also allows the user to use legacy systems on images in further post processing operations, such as neural style transfer operations. The color-shifted latent image can be used to further apply "2D" image processing technique such as tone editing or style transfer, which is more user-friendly than directly modifying volume data through transfer functions. The disclosed volume visualization approach also helps to visualize the volume data without any user interaction as compared to a conventional transfer function (TF) approach.

Figure 1:
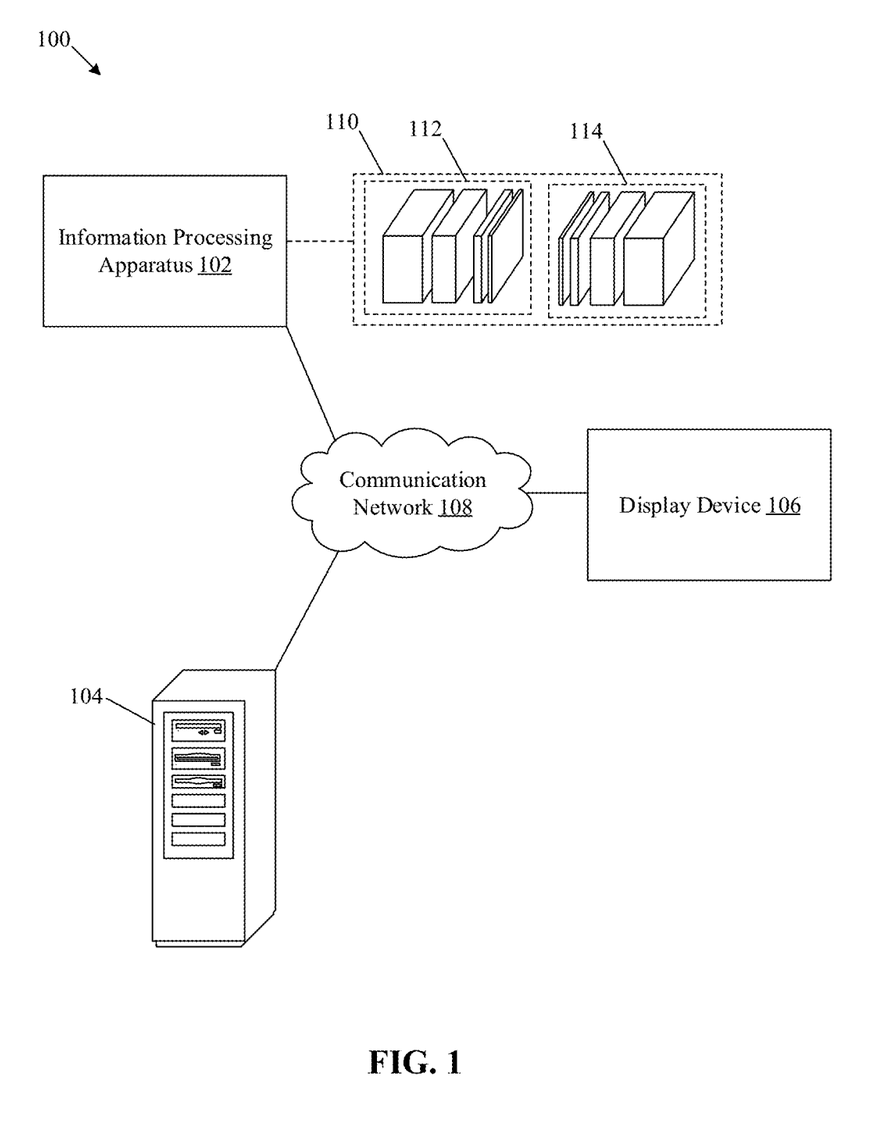
FIG. 1 is a block diagram that illustrates an exemplary environment for volume data visualization, in accordance with an embodiment of the disclosure.

FIG. 1 is a block diagram that illustrates an exemplary environment for volume data visualization, in accordance with an embodiment of the disclosure. With reference to FIG. 1, there is shown a network environment 100. The network environment 100 may include an information processing apparatus 102, a server 104, and a display device 106. The information processing apparatus 102 may be communicatively coupled to the server 104 and the display device 106, via a communication network 108. The information processing apparatus 102 may be configured to store an auto-encoder 110 that comprises an encoder network 112 and a decoder network 114. In general, the auto-encoder 110 includes two deep neural networks, i.e. the encoder network 112 and the decoder network 114. At first, the encoder network 112 may compress input high-dimensional information into low-dimensional latent representation. The decoder network 114 may approximately reconstruct the original data, i.e. the input high-dimensional information from the low-dimensional latent representation.

The information processing apparatus 102 may comprise suitable logic, circuitry, interfaces, and/or code that may be configured to generate a two-dimensional (2D) latent representation of volume data by use of a variant of the auto-encoder 110. Also, the information processing apparatus 102 may be configured to reconstruct the volume data back from the 2D latent representation by use of the same variant of the auto-encoder 110. The 2D latent representation may be for volume visualization of three-dimensional ("3D") volumetric structure in the volume data. As an example, the volume data may be voxel information or a group of 2D slice images of an object-of-interest or a scene. Examples of the information processing apparatus 102 may include, but are not limited to, a computing device, a video-conferencing system, an augmented reality (AR) device, a virtual reality (VR device), a mixed reality (MR) device, a game console, a smart wearable device, a mainframe machine, a server, a computer work-station, and/or a consumer electronic (CE) device.

The server 104 may comprise suitable logic, circuitry, interfaces, and/or code that may be configured to store a collection of volume data for volume visualization. The server 104 may also include certain metadata for the stored collection of volume data, a set of reference images and/or a set of style images as supplemental data for the auto-encoder 110. Examples of the server 104 may include, but are not limited to, an application server, a cloud server, a web server, a database server, a file server, a gaming server, a mainframe server, or a combination thereof.

The display device 106 may comprise suitable logic, circuitry, interfaces, and/or code that may be configured to display a 2D latent representation of the volume data onto a display screen of the display device 106. Additionally, in certain instances, the display device 106 may act as an input interface for a user input to the information processing apparatus 102. The display device 106 may be realized through several known technologies such as, but not limited to, a Liquid Crystal Display (LCD) display, a Light Emitting Diode (LED) display, a plasma display, and/or an Organic LED (OLED) display technology, and/or other display technologies. In accordance with an embodiment, the display device 106 may refer to a display screen of smart-glass device, a 3D display, a see-through display, a projection-based display, an electro-chromic display, and/or a transparent display. In FIG. 1, the display screen is shown as a separate device from the information processing apparatus 102; however, in certain embodiments, the entire functionality of the display device 106 may be incorporated in the information processing apparatus 102, without a deviation from the scope of the disclosure.

The communication network 108 may include a communication medium through which the information processing apparatus 102 may be communicatively coupled to the server 104 and the display device 106. Examples of the communication network 108 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

In operation, the auto-encoder 110 may be initially deployed on the information processing apparatus 102. The aspect of volume visualization of volume data may be considered as a compression of view-dependent "3D" information in the volume data into 2D domain, i.e. a 2D latent representation of the volume data. As auto-encoders are usually known to compress/convert original data into low-dimensional latent variables, the auto-encoder 110, deployed on the information processing apparatus 102, may be considered as suitable for the volume visualization of the volume data.

The auto-encoder 110 may consist of two deep neural networks, i.e. the encoder network 112 and the decoder network 114. At first, the information processing apparatus 102 may be configured to input volume data to the encoder network 112 and generate a latent image as an output of the encoder network 112 based on the application of the encoder network 112 on the input volume data. As an example, the input volume data may include voxel information sampled at regularly aligned voxel centers for an object-of-interest in 3D space. Each voxel in the voxel information may include a set of channels that define a set of volumetric attributes for the corresponding voxel. The volume data may be for example, a "$256^3$" scalar data or a "$128^3$" simulated fluid data, each of whose voxel contains a four-dimensional ("4D") property vector. Examples of the set of volumetric attributes may include, but are not limited to, a density attribute, a stiffness attribute, a flow direction attribute, and a temperature attribute.

The information processing apparatus 102 may be configured to compress, by the encoder network 112, the input volume data along a user-defined depth axis of the input volume data to generate the latent image. The generated latent image may be a "3-channel" RGB image and may be a 2D latent representation of the input volume data. The input volume data may be considered as input high-dimensional information and may be compressed into low-dimensional latent representation, i.e. the latent image of the volume data. In such instances, one direction is defined as the depth axis, along which the information processing apparatus 102 applies the encoder network 112 to compress the input volume data into the latent image. All sample data along the depth axis is concatenated into a "1D" array.

In certain instances, the information processing apparatus 102 may be further configured to input the generated latent image to the decoder network 114 and generate reconstructed volume data based on application of the decoder network 114 on the generated latent image. The reconstructed volume data may be an approximation of the original data, i.e. the volume data. Although the generated latent image is a volume-informative latent representation of the input volume data; however, in certain instances, the generated latent image includes unnaturally wide variation of colors. Therefore, in some embodiments, the information processing apparatus 102 may be configured to specify a reference image or a set of reference images to guide a final color scheme of the latent image. Additionally or alternatively, the information processing apparatus 102 may be configured to receive an input (e.g., a user input) for a selection of a color image as the reference image from a set of color images.

The information processing apparatus 102 may be further configured to estimate a distance between the generated latent image and the reference image based on a loss function. The loss function may be a color loss function which indicates a color loss in the generated latent image with respect to the reference image. The information processing apparatus 102 may be further configured to update the encoder network 112 based on the estimated distance. By way of example, the encoder network 112 may be updated as part of training of the encoder neural network. A plurality of neural weights and/or other hyper-parameters of the encoder network 112 may be updated based on back-propagation methods, known to one ordinarily skilled in the art. The information processing apparatus 102 may be configured to output the updated encoder network as a trained encoder network based on the estimated distance being a minimum. As an example, the encoder network 112 may be updated iteratively for a certain number of epochs until the estimated distance being a minimum. The trained encoder network produces a more realistic latent image and opens the way to apply many image processing techniques for natural images.

Figure 2:
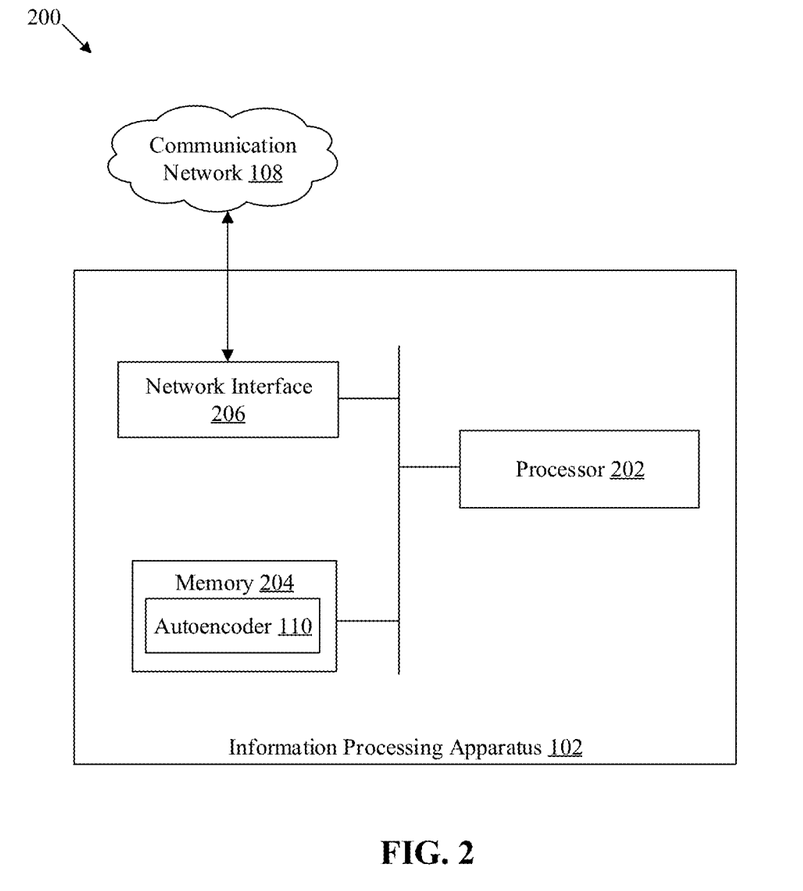
FIG. 2 is a block diagram that illustrates an exemplary information processing apparatus for volume data visualization, in accordance with an embodiment of the disclosure.

FIG. 2 is a block diagram that illustrates an exemplary information processing apparatus for volume data visualization, in accordance with an embodiment of the disclosure. FIG. 2 is explained in conjunction with elements from FIG. 1. With reference to FIG. 2, there is shown a block diagram 200 of the information processing apparatus 102. The information processing apparatus 102 may include one or more processors, such as a processor 202. The information processing apparatus 102 may further include a memory 204 and a network interface 206. The memory may be configured to store the auto-encoder 110.

The processor 202 may comprise suitable logic, circuitry, and/or interfaces that may be configured to execute operations based on instructions stored in the memory 204. Some of the operations include, for example, a training operation for the auto-encoder 110, generation of latent representations of volume data based on application of the auto-encoder 110, application of neural style transfer functions on the generated latent representations, and the like. Examples of the processor 202 may be a Graphical Processing Unit (GPU), a Central Processing Unit (CPU), a Reduced Instruction Set Computing (RISC) processor, an Application-Specific Integrated Circuit (ASIC) processor, a Complex Instruction Set Computing (CISC) processor, a co-processor, other processors, and/or a combination thereof.

The memory 204 may comprise suitable logic, circuitry, and/or interfaces that may be configured to store instructions executable by the processor 202. The memory 210 may be further configured to store the auto-encoder 110, training data for the auto-encoder 110, or a set of color images to be used as reference images or as style images for neural style transfer application. The memory 204 may be a persistent memory, a non-persistent memory, or a combination thereof. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, interfaces, and/or code that may be configured to establish a communication among the information processing apparatus 102, the server 104, other devices, for example, the display device 106, via the communication network 108. The network interface 206 may be implemented by use of various known technologies to support wired or wireless communication of the information processing apparatus 102 with the communication network 108. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS). The operations of the processor 202 are described in detail, for example, in FIG. 3, FIG. 4, FIG. 5, and FIG. 6.

Figure 3:
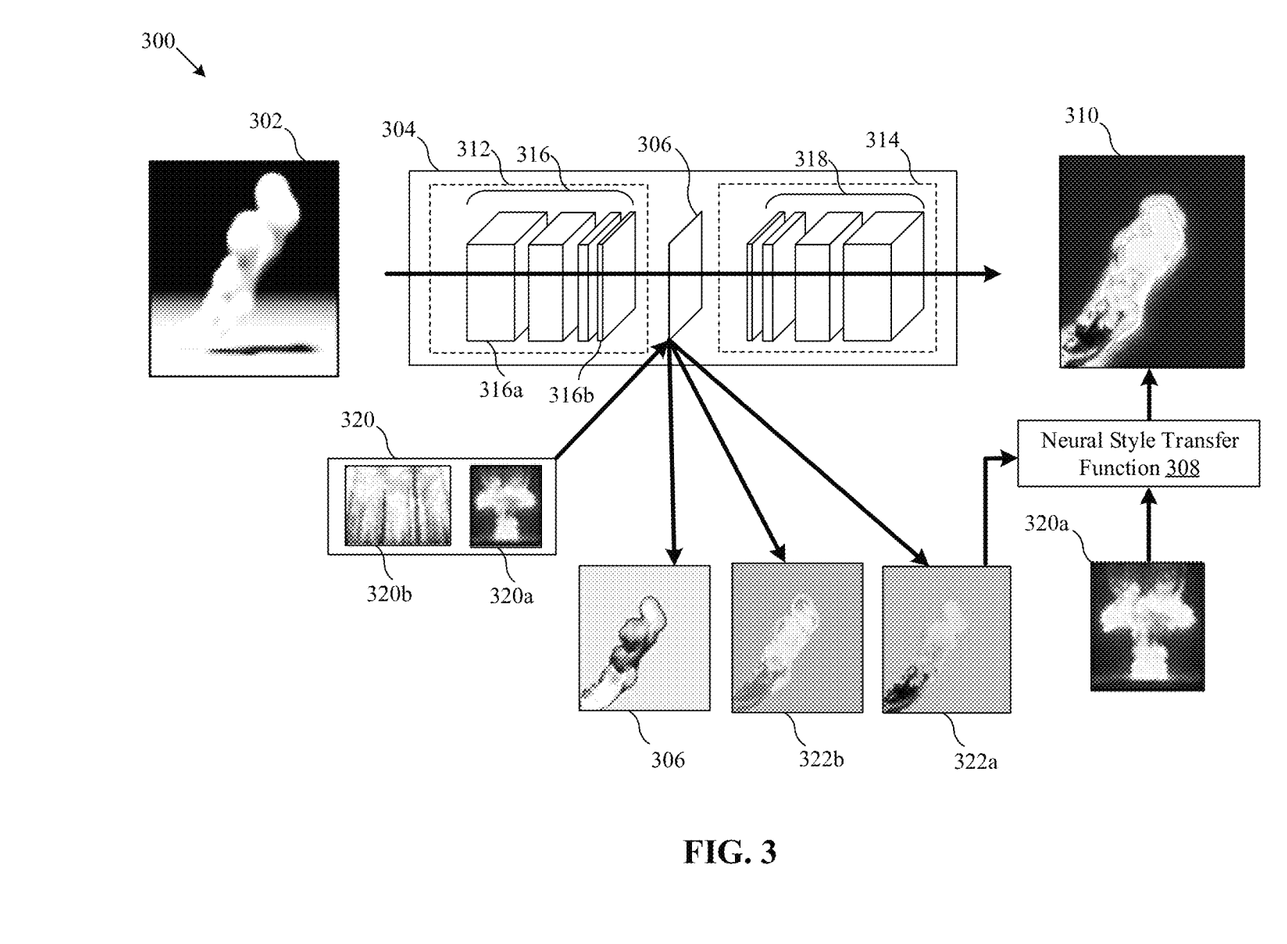
FIG. 3 is a diagram that illustrates an exemplary scenario for volume data visualization, in accordance with an embodiment of the disclosure.

FIG. 3 is a diagram that illustrates an exemplary scenario for volume data visualization, in accordance with an embodiment of the disclosure. FIG. 3 is explained in conjunction with elements from FIG. 1 and FIG. 2. With reference to FIG. 3, there is shown a diagram 300 of an exemplary scenario for volume data visualization. In the exemplary scenario, volume data 302 is provided as an input to an auto-encoder 304, and then a latent image 306 (3-channel RGB image) is generated as an intermediate output of the auto-encoder 304. The latent image 306 or a color shifted-latent image is further provided as an input to a neural style transfer function 308 that uses a 2D image stylization technique referred to as neural style transfer to generate a style-transferred image 310, i.e. a final RGB image.

The auto-encoder 304 includes an encoder network 312 and a decoder network 314. The encoder network 312 includes a loss function and a first plurality of NN layers 316. Similarly, the decoder network 314 includes a second plurality of NN layers 318. As an example, both the encoder network 312 and the decoder network 314 includes "4" NN layers. The processor 202 may be configured to input the volume data 302 to an initial NN layer 316a of the first plurality of NN layers 316 of the encoder network 312. The input volume data 302 may be sampled at regularly aligned voxel centers. Each voxel of the input volume data 302 may include arbitrary number of channels that describe a volumetric property (e.g., density, stiffness, temperature, and the like). One direction is defined as the depth axis, along which the encoder network 312 compresses the input volume data 302. All samples of the input volume data 302 along the depth axis may be concatenated into a "1D" array. As an example, the input volume data 302 may be either a "256³" scalar data or a "128³" simulated fluid data, each of whose voxel contains a 4D property vector (density and flow direction).

The processor 202 may be configured to generate the latent image 306 as an output from a final NN layer 316b of the encoder network 312 based on application of the encoder network 312 on the input volume data 302. Typically, application of a conventional auto-encoder on input data (for example, images or voxels) includes application of consecutive convolution kernels along all axes that reduce or enlarge the input data. In contrast, the application of the encoder network 312 on the input volume data 302 changes the dimension only along the depth axis, which may be defined by a user. More specifically, the processor 202 may be configured to compress, by the encoder network 312, the input volume data 302 along a user-defined depth axis of the input volume data 302 to generate the latent image 306. The compression may be viewed as channels number reduction of a "2D" image, rather than image dimension reduction and may be, for example, implemented by the encoder network 312 with 2D image convolution layers having a kernel size of "1".

The generated latent image 306 conveys more information about volumetric structure than the input volume data 302. Evidently, shown as an example, the generated latent image 306 for fluid data conveys more information than a preview of the fluid data (i.e. the volume data 302). Although the generated latent image 306 is a volume-informative image; however, in certain instances, the generated latent image 306 includes unnaturally wide variation of colors. Therefore, as one embodiment, a reference image or a set of reference images 320 may be specified to guide a final color scheme of a final image to be rendered on the display device 106. As an example, the final image may be the latent image 306 and/or the style-transferred image 310.

In one or more embodiments, the processor 202 may be configured to receive an input (for example, a user input) for a selection of a color image as the reference image from a set of color images. Alternatively, the processor 202 may be configured to randomly select a color image as the reference image from the set of color image. Shown as an example, the select color image is one of an explosion image 320a or a green forest image 320b. The reference image guides a color scheme of the generated latent image 306.

The processor 202 may be further configured to estimate a distance between the generated latent image 306 and the reference image based on the loss function for the encoder network 312. The loss function may be a color loss function which indicates a color loss in the generated latent image 306 with respect to the reference image. The distance may correspond to an image color loss estimated as the mean square error at each pixel value between the reference image and the generated latent image 306. The distance may be re-estimated between the reference image and the generated latent image 306 for a certain number of epochs.

The processor 202 may be further configured to update the encoder network 312 based on the estimated distance and output the updated encoder network as a trained encoder network based on the estimated distance being a minimum. By way of example, the update of the encoder network 312 may correspond to an update of neural weights of the encoder network 312 based on a back-propagation method. Additionally or alternatively, the update of the encoder network 312 may correspond to an update of one or more hyper-parameters of the encoder network 312 in certain number epochs of training of the encoder network 312. The updated encoder network or the trained encoder network may output a more realistic latent image that describes the 3D volumetric structure of the input volume data 302 more than that obtained using conventional volume rendering techniques, for example, conventional TF-based volume rendering techniques.

In some embodiments, the processor 202 may be configured to input the volume data 302 to the initial NN layer 316a of the trained encoder network and generate a color-shifted latent image as an output from the final NN layer 316b of the trained encoder network. The color-shifted latent image may be generated based on the application of the trained encoder network on the input volume data 302. By way of example, the effect of the reference image on the final color scheme of the generated color-shifted latent image is shown in FIG. 3. When the reference image is the explosion image 320a, the color-shifted latent image is a red image 322a that consists of mostly orange and black colors. Alternatively, when the reference image is the green forest image 320b, the color-shifted latent image is a green image 322b that consists of mostly green and black colors. It should be noted here that a color variation in the color-shifted latent image (e.g., the red image 322a or the green image 322b) is significantly lower than the latent image 306 generated without the reference image.

In some embodiments, the processor 202 may be configured to generate the style-transferred image 310 based on application of the neural style transfer function 308 on the generated latent image 306. The neural style transfer function 308 may be based on a style transfer neural network trained to output the style-transferred image 310. The neural style transfer function 308 may require a style image and a target image as inputs so as to transfer certain appearance attributes of the style image on the target image. In this embodiment, the target image may be the latent image 306 or the color-shifted latent image. Shown as an example, the green image 322b as the target image, along with the explosion image 320a as the style image may be provided as the inputs to the neural style transfer function 308. The neural style transfer function 308 applies certain appearance attributes of the explosion image 320a on the green image 322b so as to output the style-transferred image 310. In certain instances, the style-transferred image 310 may be finally rendered on the display device 106 as a 2D view-dependent representation of the input volume data 302.

Figure 4:
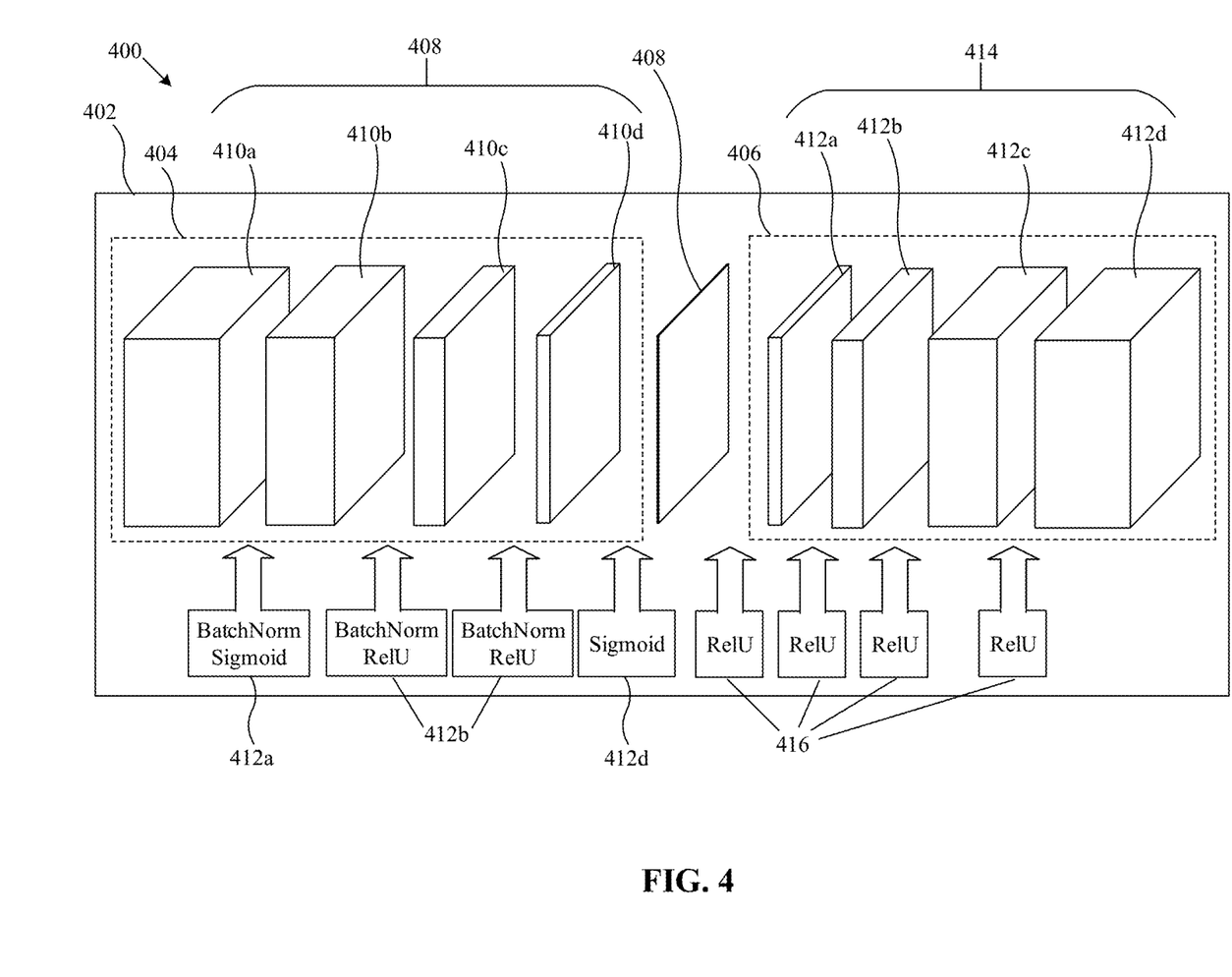
FIG. 4 is a diagram that illustrates an exemplary variant of an auto-encoder, in accordance with an embodiment of the disclosure.

FIG. 4 is a diagram that illustrates an exemplary variant of an auto-encoder, in accordance with an embodiment of the disclosure. FIG. 4 is explained in conjunction with elements from FIG. 1, FIG. 2, and FIG. 3. With reference to FIG. 4, there is shown a diagram 400 of an exemplary variant of an auto-encoder 402. The auto-encoder 402 includes an encoder network 404 and a decoder network 406. While the encoder network 404 is suitable for compression of input high-dimensional information into low-dimensional latent representation, the decoder network 406 is suitable for approximate reconstruction of the original data, i.e. the input high-dimensional information back from the low-dimensional latent representation. In the present disclosure, the input high-dimensional information is volume data including voxel information sampled at regularly aligned voxel centers for an object-of-interest in 3D space, while the low-dimensional latent representation is a latent image 408 or a color-shifted latent image.

The encoder network 404 includes a first plurality of NN layers 410. The first plurality of NN layers 410 include four fully connected (FC) layers. These four FC layers may be implemented, for example, as a size "1" convolution kernel layer, while the original channel numbers ("256-512") may be decreased down to "3". The four FC layers include an initial NN layer 410a, a second NN layer 410b, a third NN layer 410c, and a final NN layer 410d. The initial NN layer 410a is followed by a batch normalization and sigmoid activation function 412a, while the second NN layer 410b and the third NN layer 410c are followed by a batch normalization function and ramp function 412b (also referred to as a Rectified Linear Unit (ReLU), and the final NN layer 410d is followed by a sigmoid activation function 412d.

The decoder network 406 includes a second plurality of NN layers 414. The second plurality of NN layers 414 includes four FC layers. Each layer of the decoder network 406 may be connected with a ramp activation function 416 without a batch normalization function, which up-samples the latent image 408 into approximate volume data. The loss between input and output may be measured by mean square errors.

Figure 5:
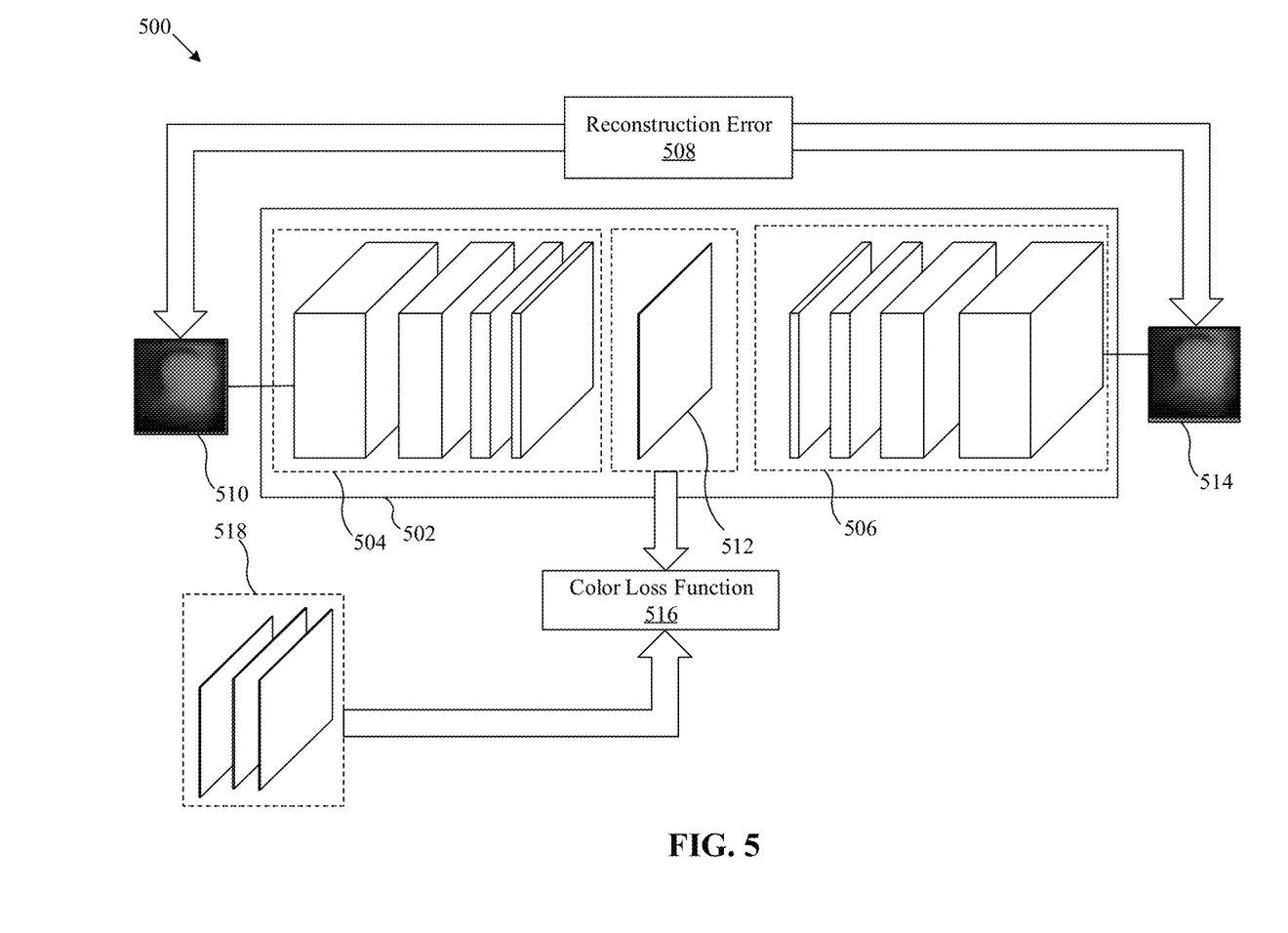
FIG. 5 is a diagram that illustrates training of an encoder network and a decoder network, in accordance with an embodiment of the disclosure.

FIG. 5 is a diagram that illustrates training of an encoder network and a decoder network, in accordance with an embodiment of the disclosure. FIG. 5 is explained in conjunction with elements from FIG. 1, FIG. 2, FIG. 3, and FIG. 4. With reference to FIG. 5, there is shown a diagram 500 of an auto-encoder 502 that includes an encoder network 504 and a decoder network 506.

Exemplary operations are described herein for training of the encoder network 504 and/or the decoder network 506 based on a reconstruction error 508. The processor 202 may be configured to input volume data 510 to the encoder network 504. The input volume data 510 may be sampled at regularly aligned voxel centers. The processor 202 may be further configured to generate a latent image 512 as an output from the encoder network 504 based on application of the encoder network 504 on the input volume data 510.

The processor 202 may be configured to input the latent image 512 to an initial NN layer of the decoder network 506 and generate reconstructed volume data 514 as an output from a final NN layer of the decoder network 506 based on application of the decoder network 506 on the generated latent image 306. The processor 202 may be further configured to estimate the reconstruction error 508 between the reconstructed volume data 514 and the input volume data 510 and update both the encoder network 504 and the decoder network 506 based on the estimated reconstruction error 508. Thereafter, the processor 202 may be configured to output the updated encoder network and the updated decoder network based on the estimated reconstruction error 508 being a minimum. By way of example, the update of the encoder network 504 or the decoder network 506 may correspond to an update of neural weights of the encoder network 504 or the decoder network 506, respectively. Additionally or alternatively, the update of the encoder network 504 or the decoder network 506 may correspond to an update of one or more hyper-parameters of the encoder network 504 or the decoder network 506, respectively, in certain number epochs of the training of the decoder network 314. The updated decoder network may reconstruct the input volume data 510 so that the reconstructed volume data 514 nearly approximates the input volume data 510.

Exemplary operations are described herein for training of the encoder network 504 based on a color loss function 516. The processor 202 may be configured to receive an input for a selection of a color image as a reference image from a set of color images 518. Alternatively, the processor 202 may be configured to randomly select a color image as the reference image from the set of color images 518.

The processor 202 may be further configured to estimate a distance between the generated latent image 512 and the reference image based on the color loss function for the encoder network 504. The color loss function may indicate a color loss in the generated latent image 512 with respect to the reference image. The processor 202 may be further configured to update the encoder network 504 based on the estimated distance and output the updated encoder network as a trained encoder network based on the estimated distance being a minimum. Further details of the training of the encoder network 504 are provided, for example, in FIG. 3.

In some exemplary embodiments, the processor 202 may be further configured to input a style-transferred image to the decoder network 506 (or the updated decoder network). The processor 202 may be further configured to generate style-transferred volume data as an output of the decoder network 506 (or the updated decoder network) based on application of the decoder network 506 on the input style-transferred image. By way of example, in case the style image is the explosion image, the style transferred volume data conveys certain appearance attributes of the explosion image (i.e. the style image) and the final color scheme of the input style-transferred image is also conveyed by the style transferred volume data.

Figure 6:
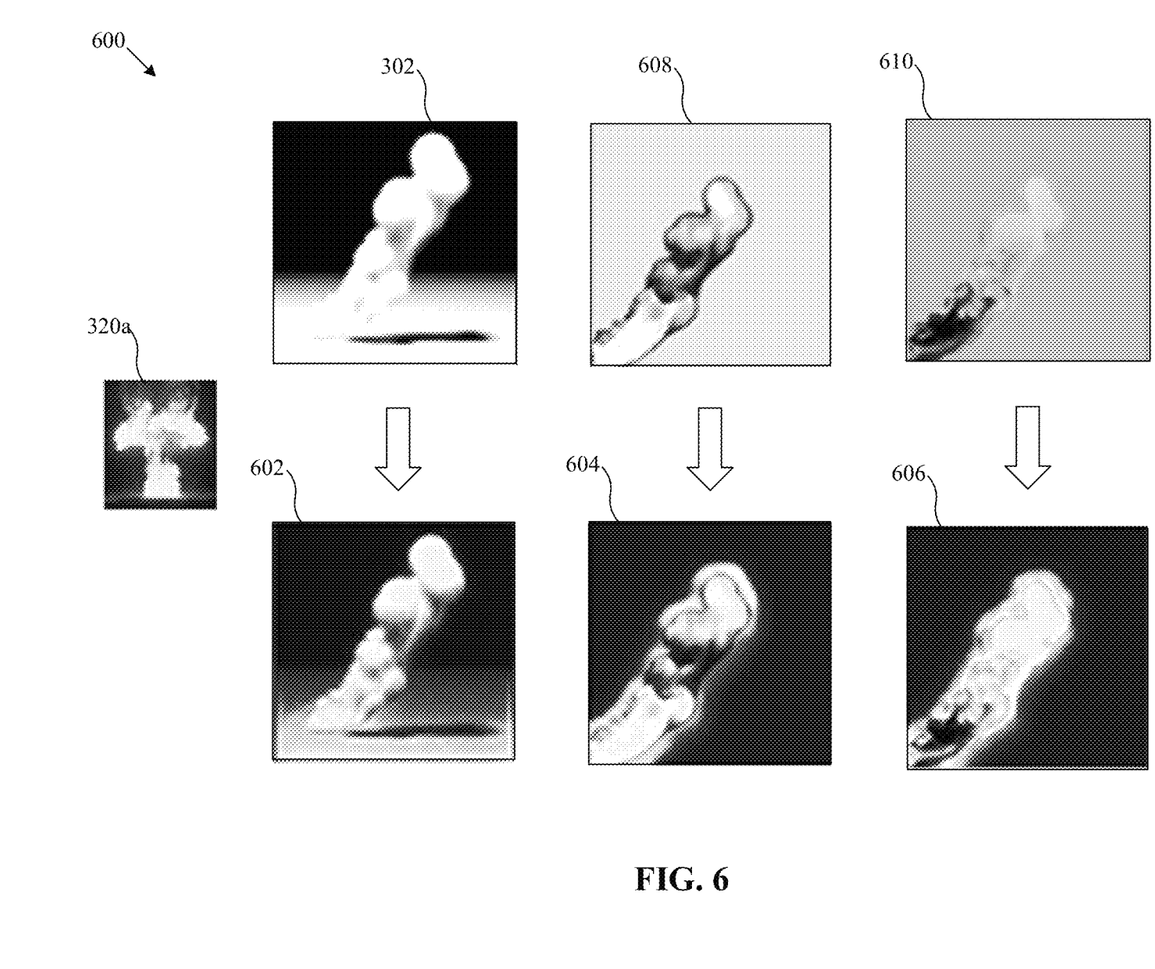
FIG. 6 is a diagram that illustrates an exemplary application where color style variation production and style transfer are combined, in accordance with an embodiment of the disclosure.

FIG. 6 is a diagram that illustrates an exemplary application where color style variation production and style transfer are combined, in accordance with an embodiment of the disclosure. FIG. 6 is explained in conjunction with elements from FIG. 1, FIG. 2, FIG. 3, FIG. 4, and FIG. 5. With reference to FIG. 6, there is shown a diagram 600 illustrating an effect of a color scheme change on improvement in a visual quality of outputs produced by a neural style transfer function. In the diagram 600, there is shown a style-transferred volume data 602, obtained after application of the decoder network 314 on the style-transferred image 310. The style-transferred image 310 may be generated after application of the neural style transfer function 308 on the latent image 306, obtained after application of the encoder network 312 on the volume data 302 i.e. raw volume data. The explosion image 320a as the style image may be provided as an input to the neural style transfer function 308 so as transfer certain appearance attributes of the explosion image 320a on the style-transferred image 310.

In the diagram 600, there is further shown a first style-transferred image 604 and a second style-transferred image 606, obtained based on application of the neural style transfer function 308 on a first latent image 608 and a second latent image 610, respectively. Here, the first latent image 608 may be generated without a reference image, while the second latent image 610 may be generated with the explosion image 320a as the reference image.

By way of example, the neural style transfer function 308 includes a plurality of layers of a pre-trained neural network that produces the style-transferred image 310 from an input image. The neural style transfer function 308 may analyze, by the pre-trained neural network, the input image and requires a style image as input to output the style-transferred image 310. With a color shift in the latent image 306 based on a reference image, application of the neural style transfer function 308 on the color-shifted latent image may produce more natural and realistic style-transferred images.

Figure 7:
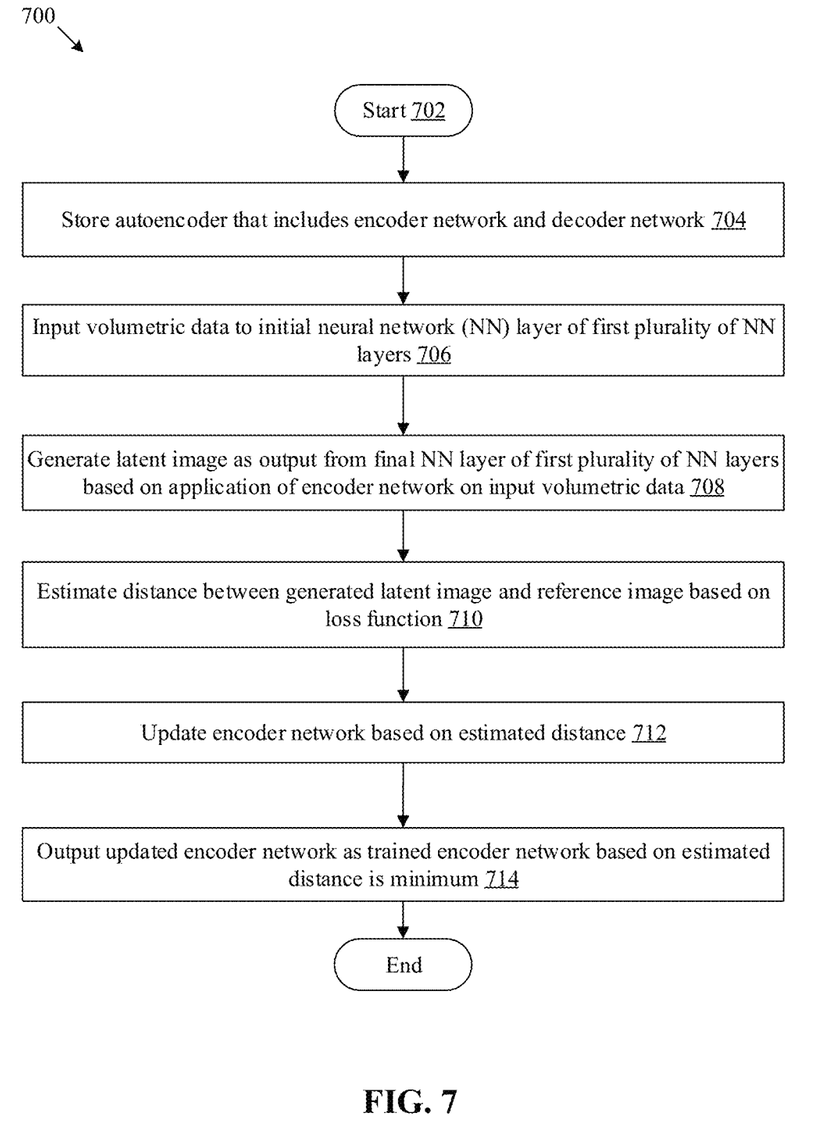
FIG. 7 is a flowchart that illustrates exemplary operations for volume data visualization, in accordance with an embodiment of the disclosure.

FIG. 7 is a flowchart that illustrates exemplary operations for volume data visualization, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown a flowchart 700. The method illustrated in the flowchart 700 may start from 702 and proceed to 704.

At 704, the auto-encoder 110 that includes the encoder network 112 and the decoder network 114 may be stored. In one or more embodiments, the memory 204 may be configured to store the auto-encoder 110.

At 706, volume data may be input to an initial NN layer of a first plurality of NN layers of the encoder network 112. In one or more embodiments, the processor 202 may be configured to input the volume data to the initial NN layer of the first plurality of NN layers of the encoder network 112.

At 708, a latent image may be generated as an output from a final NN layer of the first plurality of NN layers based on application of the encoder network 112 on the input volume data. In one or more embodiments, the processor 202 may be configured to generate the latent image as the output from the final NN layer of the first plurality of NN layers based on application of the encoder network 112 on the input volume data.

At 710, a distance may be estimated between the generated latent image and a reference image based on the loss function. In one or more embodiments, the processor 202 may be configured to estimate the distance between the generated latent image and the reference image based on the loss function.

At 712, the encoder network 112 may be updated based on the estimated distance. In one or more embodiments, the processor 202 may be configured to update the encoder network 112 based on the estimated distance.

At 714, the updated encoder network may be output as a trained encoder network based on the estimated distance being a minimum. In one or more embodiments, the processor 202 may be configured to output the updated encoder network as the trained encoder network based on the estimated distance being the minimum. Control passes to end.

Figure 8:
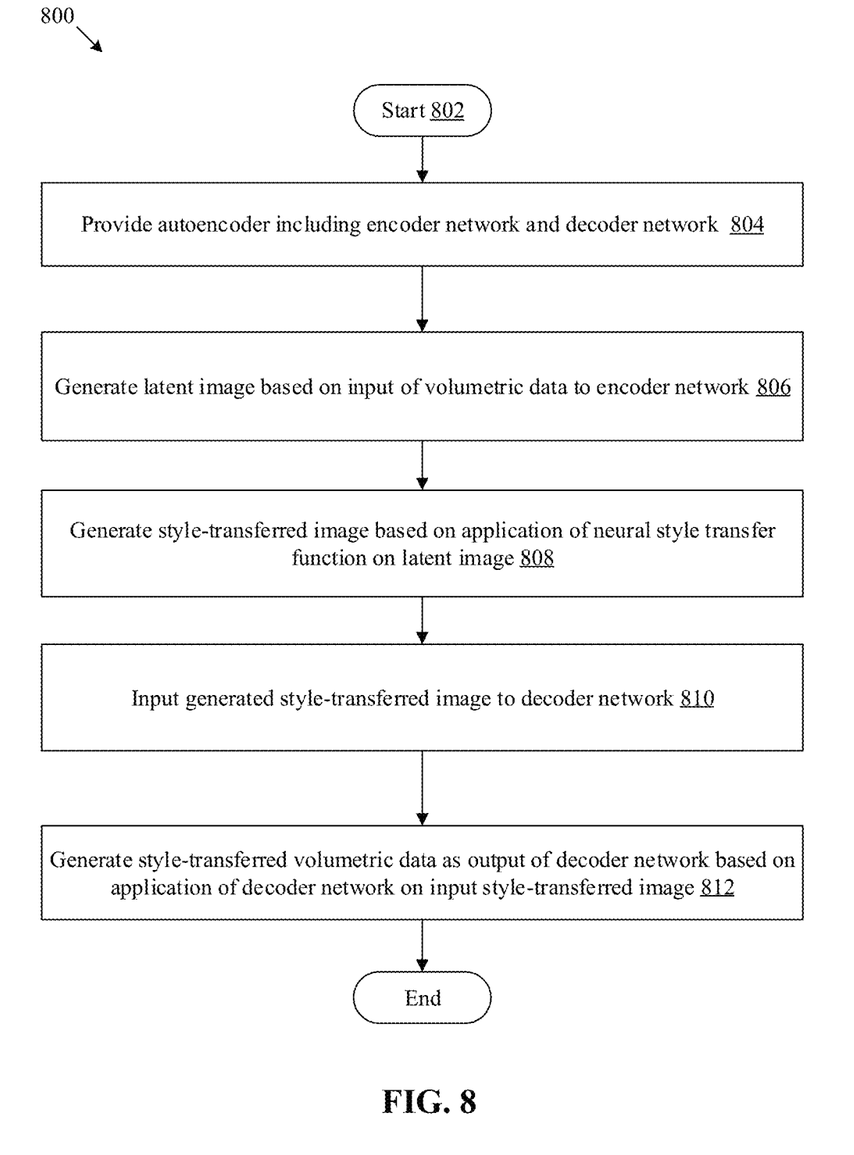
FIG. 8 is a flowchart that illustrates exemplary operations for generation of style-transferred volume data from a style-transferred image, in accordance with an embodiment of the disclosure.

FIG. 8 is a flowchart that illustrates exemplary operations for generation of style-transferred volume data from a style-transferred image, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown a flowchart 800. The method illustrated in the flowchart 800 may be performed by any computing system, for example, the information processing apparatus 102, and may start from 802 and proceed to 804.

At 804, the auto-encoder 110 including the encoder network 112 and the decoder network 114 may be provided. In one or more embodiments, the information processing apparatus 102 may be configured to provide the auto-encoder 110 that includes the encoder network 112 and the decoder network 114.

At 806, a latent image may be generated based on an input of volume data to the encoder network 112. In one or more embodiments, the processor 202 may be configured to generate the latent image based on the input of the volume data to the encoder network 112. The encoder network 112 may be trained based on a loss function which measures a distances between the latent image and the volume data.

At 808, a style-transferred image may be generated based on application of a neural style transfer function on the latent image. The neural style transfer function may be based on a style transfer neural network trained to output the style-transferred image. In one or more embodiments, the processor 202 may be configured to generate the style-transferred image based on application of the neural style transfer function on the latent image.

At 810, the generated style-transferred image may be input to the decoder network 114. In one or more embodiments, the processor 202 may be configured to input the generated style-transferred image to the decoder network 114.

At 812, style-transferred volume data may be generated as an output of the decoder network 114 based on application of the decoder network 114 on the input style-transferred image. In one or more embodiments, the processor 202 may be configured to generate style-transferred volume data as the output of the decoder network 114 based on the application of the decoder network 114 on the input style-transferred image. Control passes to end.

Various embodiments of the disclosure may provide a non-transitory computer-readable medium having stored thereon, computer implemented instructions that when executed by an information processing apparatus, causes the information processing apparatus to execute operations for volume data visualization. The non-transitory computer-readable medium includes an auto-encoder, which includes an encoder network and a decoder network. The operations include an input of volume data to an initial NN layer of a first plurality of NN layers of the encoder network and generation of a latent image as an output from a final NN layer of the first plurality of NN layers based on application of the encoder network on the input volume data. The operations further include estimation of a distance between the generated latent image and a reference image based on the loss function and an update of the encoder network based on the estimated distance. The operations further include an output of the updated encoder network as a trained encoder network based on the estimated distance being a minimum.

Various embodiments of the disclosure may provide a non-transitory computer-readable medium having stored thereon, computer implemented instructions that when executed by an information processing apparatus, causes the information processing apparatus to execute operations for volume data visualization. The operations include providing an auto-encoder that includes an encoder network and a decoder network. The encoder network may be trained to output a latent image based on an input of volume data to the encoder network and the encoder network may be trained based on a loss function which measures a distances between the latent image and the volume data. The operations further include generation of a style-transferred image based on application of a neural style transfer function on the latent image. The neural style transfer function may be based on a style transfer neural network trained to output the style-transferred image. The operations further include an input of the generated style-transferred image to the decoder network and generation of style-transferred volume data as an output of the decoder network based on application of the decoder network on the input style-transferred image.

Exemplary aspects of the disclosure may provide the information processing apparatus 102 that includes the processor 202 and the memory 204 configured to store the auto-encoder 110 that includes the encoder network 112 and the decoder network 114. The encoder network 112 may include a loss function and a first plurality of NN layers. The processor 202 may be configured to input volume data to an initial NN layer of the first plurality of NN layers and generate a latent image as an output from a final NN layer of the first plurality of NN layers based on application of the encoder network 112 on the input volume data. The processor 202 may be further configured to estimate a distance between the generated latent image and a reference image based on the loss function and update the encoder network 112 based on the estimated distance. Thereafter, the processor 202 may be configured to output the updated encoder network as a trained encoder network based on the estimated distance being a minimum.

In accordance with an embodiment, the auto-encoder 110 is a Deep Neural Network (DNN) and the input volume data includes voxel information sampled at regularly aligned voxel centers for an object-of-interest in 3D space. Each voxel in the voxel information may include a set of channels that define a set of volumetric attributes for the corresponding voxel.

In accordance with an embodiment, the processor 202 may be further configured to compress, by the encoder network 112, the input volume data along a user-defined depth axis of the input volume data to generate the latent image. The generated latent image may be a 3-channel RGB image and a 2D latent representation of the input volume data.

In accordance with an embodiment, the processor 202 may be further configured to receive an input for a selection of a color image as the reference image from a set of color images. The color image may be an explosion image or a green forest image. Also, the loss function may be a color loss function which indicates a color loss in the generated latent image with respect to the reference image.

In accordance with an embodiment, the processor 202 may be further configured to input the volume data to the initial NN layer of the trained encoder network and generate a color-shifted latent image as an output from the final NN layer of the trained encoder network, based on the application of the trained encoder network on the input volume data. The processor 202 may be further configured to generate a style-transferred image based on application of a neural style transfer function on the generated latent image. The neural style transfer function may be based on a style transfer neural network trained to output the style-transferred image.

In accordance with an embodiment, the processor 202 may be further configured to input the generated style-transferred image to the decoder network 114 and generate style-transferred volume data as an output of the decoder network 114 based on application of the decoder network 114 on the input style-transferred image.

In accordance with an embodiment, the processor 202 may be further configured to input the generated latent image to an initial NN layer of a second plurality of NN layers of the decoder network and generate reconstructed volume data as an output from a final NN layer of the second plurality of NN layers based on application of the decoder network 114 on the generated latent image. The processor 202 may be further configured to estimate a reconstruction error between the reconstructed volume data and the input volume data and update both the encoder network 112 and the decoder network 114 based on the estimated reconstruction error. Finally, the processor 202 may be configured to output the updated decoder network 114 and the updated encoder network 112 based on the estimated reconstruction error being a minimum.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. An information processing apparatus, comprising:
a memory configured to store an auto-encoder comprising an encoder network and a decoder network, wherein the encoder network includes a loss function and a first plurality of neural network (NN) layers; and
a processor configured to:
   input volume data to an initial neural network (NN) layer of the first plurality of NN layers;
   compress, by the encoder network, the input volume data along a user-defined depth axis of the input volume data;
   generate a latent image as an output from a final NN layer of the first plurality of NN layers based on the compression of the input volume data along the user-defined depth axis of the input volume data;
   estimate a distance between the generated latent image and a reference image based on the loss function;
   update the encoder network based on the estimated distance; and
   output the updated encoder network as a trained encoder network based on the estimated distance being a minimum.

2. The information processing apparatus according to claim 1, wherein the auto-encoder is a Deep Neural Network (DNN).

3. The information processing apparatus according to claim 1, wherein the input volume data comprises voxel information sampled at regularly aligned voxel centers for an object-of-interest in 3D space.

4. The information processing apparatus according to claim 3, wherein each voxel in the voxel information comprises a set of channels that defines a set of volumetric attributes for a corresponding voxel.

5. The information processing apparatus according to claim 1, wherein
the generated latent image is a 3-channel RGB image, and
the generated latent image is a 2D latent representation of the input volume data.

6. The information processing apparatus according to claim 1, wherein the processor is further configured to receive an input for a selection of a color image as the reference image from a set of color images.

7. The information processing apparatus in claim 6, wherein the color image is an explosion image.

8. The information processing apparatus in claim 6, wherein the color image is a green forest image.

9. The information processing apparatus according to claim 1, wherein the loss function is a color loss function which indicates a color loss in the generated latent image with respect to the reference image.

10. The information processing apparatus according to claim 1, wherein the processor is further configured to:
    input the volume data to the initial NN layer of the trained encoder network; and
    generate a color-shifted latent image as an output from the final NN layer of the trained encoder network, based on application of the trained encoder network on the input volume data.

11. The information processing apparatus in claim 1, wherein
    the processor is further configured to generate a style-transferred image based on application of a neural style transfer function on the generated latent image, and
    the neural style transfer function is based on a style transfer neural network trained to output the style-transferred image.

12. The information processing apparatus in claim 11, wherein the processor is further configured to:
    input the generated style-transferred image to the decoder network; and
    generate style-transferred volume data as an output of the decoder network based on application of the decoder network on the input style-transferred image.

13. The information processing apparatus according to claim 1, wherein the processor is further configured to:
    input the generated latent image to an initial NN layer of a second plurality of NN layers of the decoder network;
    generate reconstructed volume data as an output from a final NN layer of the second plurality of NN layers based on application of the decoder network on the generated latent image; and
    estimate a reconstruction error between the reconstructed volume data and the input volume data;
    update both the encoder network and the decoder network based on the estimated reconstruction error; and
    output the updated decoder network and the updated encoder network based on the estimated reconstruction error being a minimum.

14. A method, comprising:
    providing an auto-encoder comprising an encoder network and a decoder network, wherein the encoder network comprises a loss function and a first plurality of neural network (NN) layers;
    inputting volume data to an initial neural network (NN) layer of the first plurality of NN layers;
    compressing, by the encoder network, the input volume data along a user-defined depth axis of the input volume data;
    generating a latent image as an output from a final NN layer of the first plurality of NN layers based on the compression of the input volume data along the user-defined depth axis of the input volume data;
    estimating a distance between the generated latent image and a reference image based on a loss function for the encoder network;
    updating the encoder network based on the estimated distance; and
    outputting the updated encoder network as a trained encoder network based on the estimated distance being a minimum.

15. The method according to claim 14, further comprising:
    inputting the volume data to the initial NN layer of the trained encoder network; and
    generating a color-shifted latent image as an output from the final NN layer of the trained encoder network, based on application of the trained encoder network on the input volume data.

16. The method according to claim 14, further comprising generating a style-transferred image based on application of a neural style transfer function on the generated latent image, and
    wherein the neural style transfer function is based on a style transfer neural network trained to output the style-transferred image.

17. The method according to claim 16, further comprising:
    inputting the generated style-transferred image to the decoder network; and
    generating style-transferred volume data as an output of the decoder network based on application of the decoder network on the input style-transferred image.

18. The method according to claim 14, further comprising:
    inputting the generated latent image to an initial NN layer of a second plurality of NN layers of the decoder network;
    generating reconstructed volume data as an output from a final NN layer of the second plurality of NN layers based on application of the decoder network on the generated latent image; and
    estimating a reconstruction error between the reconstructed volume data and the input volume data;
    updating both the encoder network and the decoder network based on the estimated reconstruction error; and
    outputting both the updated encoder network and the updated decoder network based on the estimated reconstruction error being a minimum.

19. A method, comprising:
    providing an auto-encoder comprising an encoder network and a decoder network, wherein
        the encoder network is trained to generate, based on an input of volume data to the encoder network, a latent image,
        the encoder network compresses the volume data along a user-defined depth axis of the volume data, and
        the encoder network is trained based on a loss function which measures a distance between the latent image and the volume data;
    generating a style-transferred image based on application of a neural style transfer function on the latent image, wherein the neural style transfer function is based on a style transfer neural network trained to output the style-transferred image;
    inputting the generated style-transferred image to the decoder network; and
    generating style-transferred volume data as an output of the decoder network based on application of the decoder network on the input style-transferred image.

* * * * *